US009378117B2

(12) United States Patent
Payne et al.

(10) Patent No.: US 9,378,117 B2
(45) Date of Patent: Jun. 28, 2016

(54) QUEUE DEBUGGING USING STORED BACKTRACE INFORMATION

(71) Applicant: Apple Inc., Cupertino, CA (US)

(72) Inventors: David Vernon Payne, Los Altos Hills, CA (US); Daniel Andreas Steffen, San Francisco, CA (US); Han Ming Ong, Los Altos, CA (US); Jason Molenda, San Jose, CA (US); Kenneth Scott Orr, Morgan Hill, CA (US); Katherine Blake Stone, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 14/292,777

(22) Filed: May 30, 2014

(65) Prior Publication Data

US 2015/0347271 A1 Dec. 3, 2015

(51) Int. Cl.
*G06F 9/45* (2006.01)
*G06F 11/36* (2006.01)

(52) U.S. Cl.
CPC ................................. *G06F 11/3636* (2013.01)

(58) Field of Classification Search
None
See application file for complete search history.

(56) References Cited

U.S. PATENT DOCUMENTS

| 6,510,531 | B1 | 1/2003 | Gibbons |
| 8,239,838 | B2 | 8/2012 | Yim |
| 8,499,285 | B2 | 7/2013 | Schneider |
| 9,092,564 | B2 * | 7/2015 | Wischik ............. G06F 11/3632 |
| 2013/0125133 | A1 | 5/2013 | Schuster |
| 2013/0191434 | A1 * | 7/2013 | Smith ................... G06F 9/542 |
| | | | 709/201 |

* cited by examiner

*Primary Examiner* — Chuck Kendall
(74) *Attorney, Agent, or Firm* — Blakey, Sokoloff, Taylor & Zafman LLP

(57) ABSTRACT

When queuing work items for asynchronous execution, the approaches set forth herein enable a debugger to provide more meaningful and complete stack trace information for enqueued work items. An example system identifies a work item to be enqueued for asynchronous execution as a separate thread during runtime of a program. Upon enqueuing the work item in an execution queue, the system captures pre-queue stack trace information associated with the work item, and associates the pre-queue stack trace information with the work item. The system removes the work item from the execution queue for execution, wherein the execution is associated with current stack trace information separate from the pre-queue stack trace information. Upon detecting an event associated with executing the work item, the system merges the pre-queue stack trace information with the current stack trace information to yield a merged stack trace.

27 Claims, 5 Drawing Sheets

QUEUE DEBUGGING USING STORED BACKTRACE INFORMATION

BACKGROUND

1. Technical Field

The present disclosure relates to stack traces in debugging and more specifically to enabling more complete stack traces when debugging work items queued for asynchronous execution.

2. Introduction

When developing software, a developer often uses a debugger. A debugger is a software tool or program to test and debug other programs. One common feature of debuggers is the ability to provide a stack trace. A stack trace, also known as a stack backtrace or stack traceback, provides data that is or was available on the active stack or active stack frames at a certain point in time during the execution of a program or at the termination of a program, such as when a program crashes. Stack traces can be extremely useful for developers to learn the cause of a program crash, and to learn the surrounding context of the program crash.

However, as multiprocessor and multithread systems have pervaded desktop, server, and mobile computing, stack traces have been less effective in troubleshooting work items, and in particular work items that are queued for asynchronous execution. When debugging such a work item, a traditional stack trace only shows the context back to the entity that dequeued the work item from the queue. Because of this limitation, much, if not all, of the context surrounding the work item is lost and not available via a stack trace. A developer attempting to debug a program that is crashing during a critical queued work item often has insufficient information to understand the cause of the crash.

SUMMARY

When queuing work items for asynchronous execution, the approaches set forth herein enable a debugger to provide more meaningful and complete stack trace information for enqueued work items, rather than only showing stack trace information back to the point of removing the work item from the queue for execution. These approaches provide richer, more complete stack trace information for work items that are queued, which can enhance debugging data and provide developers with a more complete picture of the state of a program at a breakpoint or program crash, for example. An example system identifies a task to be enqueued for asynchronous execution as a separate work item during runtime of a program. Upon enqueuing the task in an execution queue, the system captures pre-queue stack trace information associated with the task, and associates the pre-queue stack trace information with the task. The system removes the task from the execution queue for execution, wherein the execution is associated with current stack trace information separate from the pre-queue stack trace information. Upon detecting an event associated with executing the task, the system merges the pre-queue stack trace information with the current stack trace information to yield a merged stack trace.

DETAILED DESCRIPTION

Figure 1:
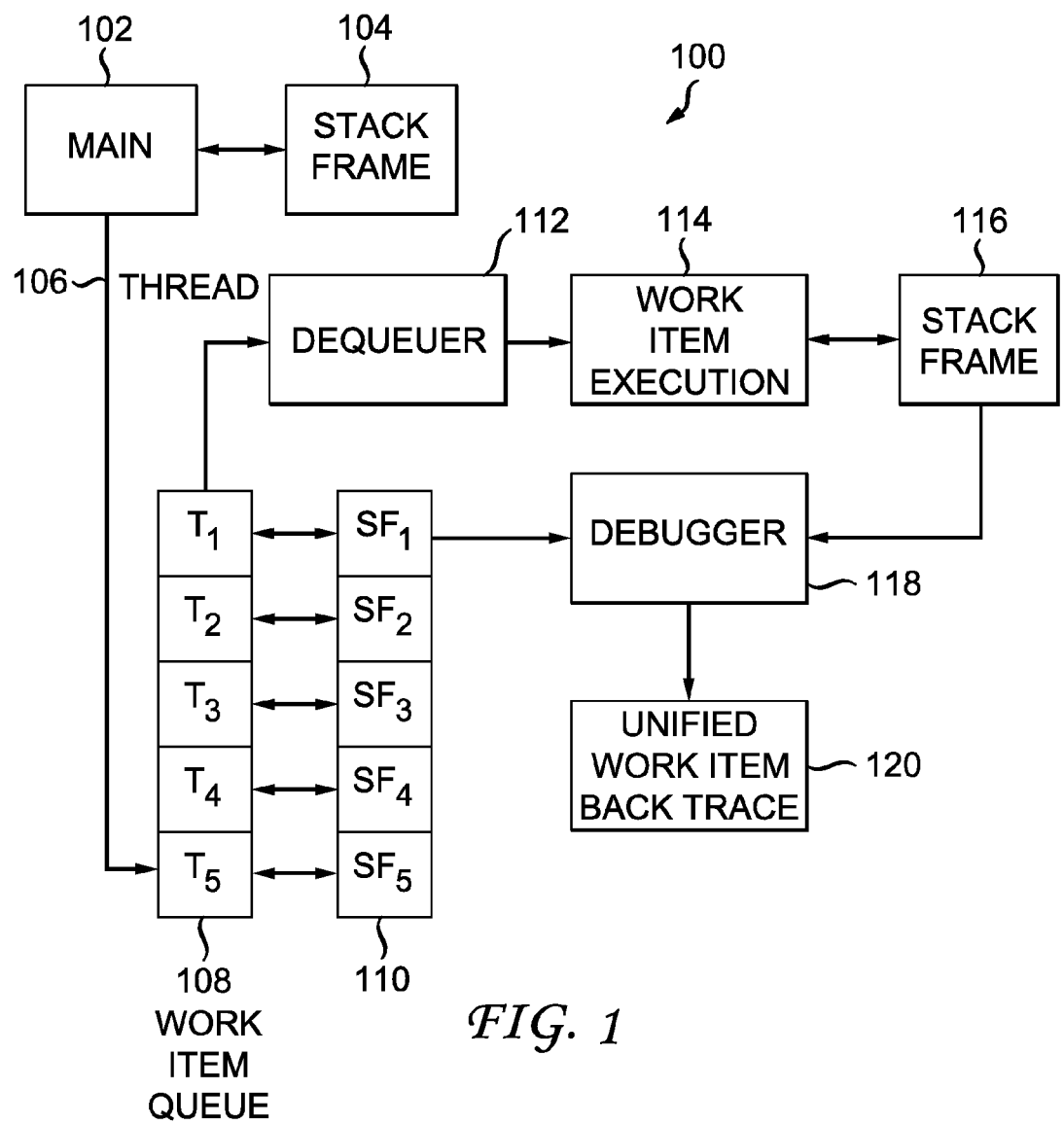
FIG. 1 illustrates an example logical flow for executing a program with asynchronous work item execution.

Disclosed herein are systems and methods for resolving the shortcomings of traditional debuggers that cannot backtrace to an origin of a function within a given stack frame implementing asynchronous execution via a work item execution queue. A system implementing the approach set forth herein can insert a first record point (or back trace recording hook) when a work item, such as a task, function, thread, or other code, is inserted into an asynchronous execution queue, and the system can insert a second record point (or back trace recording hook) when the asynchronous function is removed from the queue for execution. In other words, the system can record stack trace data when tasks are enqueued and dequeued, and link, merge, or stitch together corresponding stack trace data. The hooks allow a debugger to manage work items even across multiple execution queues.

In one example implementation, a mechanism of recording events from a dispatcher keeps a record of only the currently-relevant information, and retrieves that information for display to the user when the program stops in the debugger. The debugger can, in one variation, perform event recording by default when debugging a program, so no additional configuration is necessary. However, this can be enabled or disabled by default. The data recording functionality should be fast, use minimal memory, and have minimal impact on the behavior of the target program to encourage developer adoption. An example debugger can show an extended backtrace for a running work item, showing details of how that work item was enqueued.

The debugger can interact with a helper process, debugserver, to run a target process on a target device such as a local computer or a mobile device. Before launching the target process under the debugger, two environment variables are set which specify that the target process should run with two custom dynamic dispatch libraries to record the dispatch activity in the target process. When the target process stops in the debugger (for example, if the user manually pauses process execution, or the process hits a breakpoint, exception or crash), the debugger asks the helper process to query for information from the target process about how currently-running dispatch queue work items were enqueued (and, in turn, how those items were enqueued), as well as what work items are pending on queues. A recording component of the debugger can record all asynchronous dispatch activity in the target process, as well as information about the dispatch queues and pthreads referenced by them, so that whenever the target process stops in the debugger the information about asynchronously-enqueued dispatch work items is available.

There can be thousands of dispatch queue work items created, executed, and completed per second, and in the vast majority of cases the work items come and go without the process stopping in the debugger. So, the information about a dispatch queue work item can be maintained only as long as that item is pending, actively executing, or still has any additional work items enqueued from it which are pending or executing.

The disclosure turns now to the flow of operation in the target process. In a setup and initialization phase, before launching the target process under the debugger, the system sets two environment variables as shown below:
DYLD_LIBRARY_PATH=/usr/lib/system/introspection
DYLD_INSERT_LIBRARIES=/Application/Xcode.app/
Contents/Developer/usr/lib/libBacktraceRecording.dylib The first environment variable, DYLD_LIBRARY_PATH=/usr/lib/system/introspection, causes the target process to use an "introspectable" version of the library libdispatch.dylib rather than the standard system one. This introspection version of the library provides a mechanism to enable a client to install "hook functions" in which the library will be called when a specific event occurs. The event can include, for example, any of the following events: creation of dispatch queue, disposal of dispatch queue, enqueue of dispatch queue work item (for later asynchronous execution), dequeue of dispatch queue work item (when the work item begins execution), or completion of dispatch queue work item. These hook functions can be integrated into the standard library so that the debugger can attach to an already-running process and install the hook functions.

The second environment variable, DYLD_INSERT_LIBRARIES=/Application/Xcode.app/Contents/Developer/usr/lib/libBacktraceRecording.dylib, inserts that new dynamic library into the target process. When this library is inserted, the library runs an initialization function which installs its hook functions for the library to call. The library also installs similar hook functions for the pthread library (/usr/lib/system/pthread.dylib) to be notified of the following events: creation of pthread, start of execution of pthread (stack has been allocated), termination of pthread (stack will be deallocated), and destruction of pthread.

The second environment variable references a library having data structures. The library maintains lists of three types of objects in the target process: pthreads, dispatch queues, and dispatch queue work items. For each of these types of objects, the library maintains three "tail queue" lists: created (pending) objects, active objects (e.g. executing work items, or with additional items enqueued from them), and freed objects (entries can be reused for newly created objects). A dispatch work item can contain information such as a reference count (or the numbers and identities of other active work items enqueued from this item), an identifier (or a pointer to the library's internal data structure), a stack backtrace when the work item was enqueued, a reference to a queue or item that enqueued this item, and a target queue. Dispatch queues can contain information such as a reference count (or the numbers and identities of other active work items enqueued from this queue, or with this queue as a target), an identifier (or a serial number), a queue name, a count of running work items, and a count of pending work items. Then, links between the various dispatch work items and dispatch queues represent the queue and the relationships between dispatch work items and the dispatch queues.

Segments of these lists can be allocated directly in virtual memory (VM) regions, without going through the system malloc( ) memory allocation library, to minimize overall impact on the target process. In this way, the library does not "interfere" with malloc locks, malloc stack recording, and so forth.

The library includes functionality for event handling. For example, when the hook functions are triggered, the library can execute the corresponding example actions. The library can also perform additional bookkeeping operations, such as maintaining counts of pending and executing work items for each dispatch queue. When a hook function is triggered to enqueue a dispatch queue work item, the library can (1) verify that the work item is an "interesting" asynchronous work item (e.g., not related to the library's internal implementation details). Then the library can (2) get an unused Dispatch Work Item Info structure from the free list (or allocate another chunk of free list if necessary), and (3) initialize that Dispatch Work Item Info structure to record the following data:
  state—initialize to ENTRY_STATE_CREATED
  reference count—the number of other active work items enqueued from this (active means pending, executing, or with yet other active work items enqueued from them). Starts at 1—item referencing itself since it has not finished execution yet.
  identifier (pointer to the library's internal dispatch queue work item data structure)
  stack backtrace of the enqueuing work item
  pointer to Dispatch Work Item Info structure for work item that enqueued this
  pointer to Dispatch Queue Info structure for the enqueuing queue (if any—not all items are enqueued from queues)
  pointer to Dispatch Queue Info structure for the target queue
  pointer to Thread Info structure for the enqueuing thread As the references to the enqueuing work item, queue, thread, and target queue are created, the library can (4) create the corresponding Info structures (if they don't already exist), and increment the refcounts on those objects.

When a hook function is triggered to dequeue a dispatch queue work item (i.e. when the work item begins execution), the library can (1) verify that the work item is an "interesting" asynchronous work item (e.g., not related to the library's internal implementation details). The library can (2) find the corresponding Dispatch Work Item Info structure from when the work item was enqueued (if none then return). The library can (3) move that structure from the created dispatch queue work item list to the active dispatch queue work item list, and (4) change the Dispatch Work Item Info structure's state field to ENTRY_STATE_EXECUTING. Then the library can (5) set a thread-local variable on the current thread indicating the active work item and current dispatch queue.

When a hook function is triggered upon completion of dispatch queue work item, the library can (1) get the Dispatch Work Item Info structure from the current thread's thread local variable (if none then return). The library can (2) change the Dispatch Work Item Info structure's state field to ENTRY_STATE_COMPLETED, and (3) decrement the refcount of the work item, the enqueuing queue, the target queue, and the enqueuing thread. If the refcount of any of the objects goes to zero, the library can change its state to ENTRY_STATE_FREE and move the work item to the free list for that type of objects. If the refcount of the work item itself goes to zero, the library can (4) repeat step 3 for the enqueuing work item, and continue this loop until the end of the enqueuing chain, or until the work item has a non-zero refcount after decrementing (meaning it is still executing or still has other work items enqueued from it).

When a hook function is triggered by creation of a dispatch queue, the library can (1) get an unused Dispatch Queue Info structure from the free list (or allocate another chunk of free list if necessary). The library can (2) initialize that Dispatch Queue Info structure to record the following information:
  state—initialize to ENTRY_STATE_CREATED
  reference count—the number of work items refer to this dispatch queue (as either the enqueuing queue, or the target queue, or both). Starts at 1—the queue referencing itself since it has not been disposed yet.
  pointer to the library's internal dispatch queue data structure serial number (the library's dispatch queue identifier)
queue label (human-readable name)

In one embodiment, the system creates the Dispatch Queue Info structures the first time they are seen by the backtrace recording library, from either a "creation of dispatch queue" event, or when referenced as the enqueuing queue or target queue in an "enqueue of dispatch queue work item" event.

When a hook function is triggered by disposal of a dispatch queue, the library can (1) find the Dispatch Queue Info structure in the created list (from the library's internal data structure pointer), (2) change the Dispatch Work Item Info structure's state field to ENTRY_STATE_COMPLETED, and (3) decrement the refcount of the Dispatch Queue Info structure. If the refcount of the structure goes to zero, the library can change its state to ENTRY_STATE_FREE and move it to the free list. The library handles pthread start or termination events triggered by corresponding hook functions in an analogous way to the functionality for creating and disposing dispatch queues. The library can ignore pthread create and destroy events.

Many processes follow a common pattern in using a dispatch library to handle, for example, a large input stream by asynchronously enqueuing a dispatch queue work item to process the first chunk of that input stream. The last task of that work item is to enqueue itself again to handle the next chunk of the input stream, and so on. This, and other similar patterns of dispatch library usage, can result in essentially "infinite" enqueuing of work items. Thus, for example, the $1,000^{th}$ enqueued work item would have a very long chain of work items from which it was enqueued, which would be mostly repetitive. Showing that entire repetitive loop of enqueued work items in a debug navigator is confusing to users, and can be slow to display. Storing stack frame data for each iteration of such repetitive loops can also consume a large amount of memory to store that "infinite" chain of Dispatch Work Item Info structures in the recording library. The truly important part is the original start of that loop of enqueued work items. So, when the recording library receives the events for dequeue or completion of a dispatch queue work item, the recording library can "collapse" that recursion, in two ways. First, if the "parent" work item that directly enqueued the active work item executes the same target function and was enqueued from the same backtrace, then the new active work item is "reparented" to have the "grandparent" work item as its parent, and it takes the repeated_work_item count from the original parent, adds 1 to it, and stores it on the new work item. Second, if the active work item was not directly enqueued from an equivalent parent, then the recording library proceeds up the enqueuing chain for that work item looking for an equivalent parent. Again, if a match is found, the new work item is reparented to the matching work item's parent, and it takes the elided_work_item and repeated_work_item counts from all work items between the two, adds 1 to that total count, and stores as elided_work_item on the new work item.

FIG. 1 illustrates an example logical flow 100 for executing a main program 102 with a work item queue 108 for asynchronous work item execution. In this example, a main program 102 executes and uses a current stack frame 104. The main program 102 executes and certain portions of the main program can spawn work items 106. In the alternative, an execution engine, such as a symmetric or asymmetric multiprocessor optimization support engine, can determine that portions of the main program 102 are able to be executed in parallel and extract those portions as work items 106. Such work items 106 are enqueued in a work item queue 108, shown in FIG. 1 as work items $T_1$, $T_2$, $T_3$, $T_4$, and $T_5$. When each work item 106 is enqueued, the system can store, as a corresponding pre-queue stack frame 110, shown in FIG. 1 as $SF_1$, $SF_2$, $SF_3$, $SF_4$, and $SF_5$. The pre-queue stack frames 110 can contain all or part of the stack frame 104 at the time when the work item is enqueued 106, as well as any other descriptive data related to how, when, why, or by whom the corresponding work item was enqueued (i.e. which portion of the main program 102 cause the work item to be executed).

Figure 2:
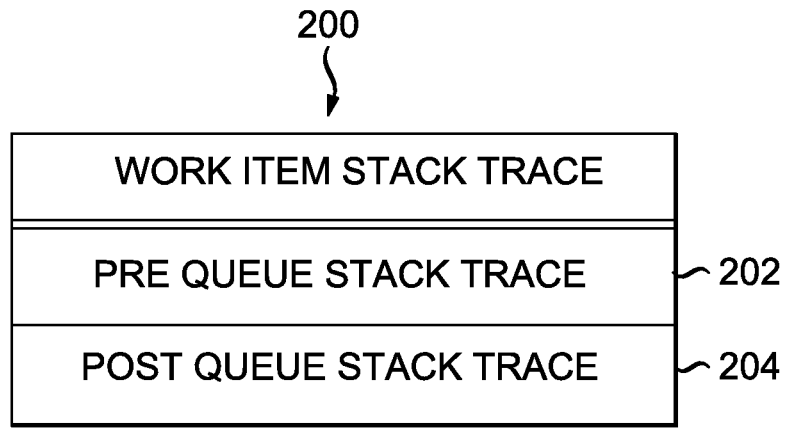
FIG. 2 illustrates an example merged work item stack trace.

A dequeuer 112 takes work items off the work item queue 108 for execution 114. When work items are executed, a post-queue stack frame 116 is generated for execution 114 of the work item. The system can automatically stitch together a corresponding one of the pre-queue stack frame 110 with the post-queue stack frame 116. However, if no specific stack frame request for execution 114 of the work item is outstanding, the system may forego retrieving and stitching together stack frames 110 and 116 for performance, security, memory, or other reasons. For example, the system may not stitch together any stack frames until requested by a debugger 118. The debugger can then request or retrieve the corresponding one of the pre-queue stack frame 110 and the post-queue stack frame 116, and stitch them together to yield a unified work item back trace 120. In one embodiment, the unified work item back trace 120 is completely transparent and shows which portions are from a pre-queue stack frame 110 and which portions are from a post-queue stack frame 116. In another embodiment, the unified work item back trace 120 does not provide any indication of the source of the back trace information, instead presenting the unified work item back trace 120 as a unitary whole. FIG. 2 illustrates an example unified work item stack trace 200 with a pre-queue stack trace 202 and a post-queue stack trace 204.

Figure 3:
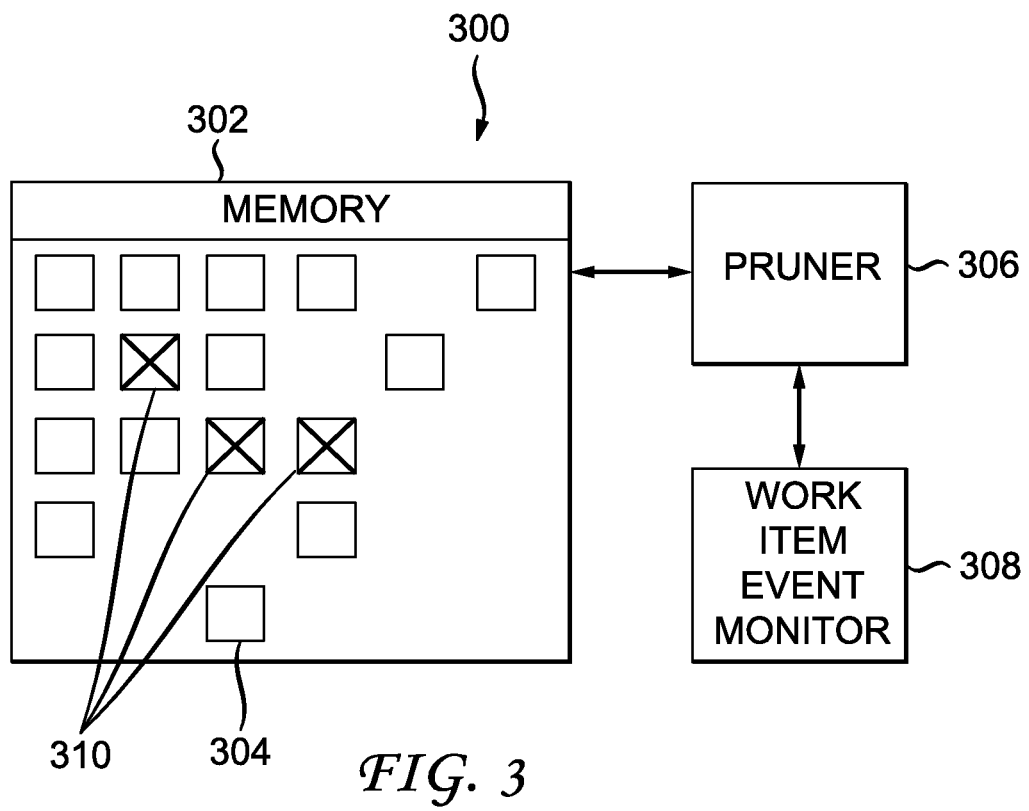
FIG. 3 illustrates an example pruner for clearing stack trace data from memory.

When a main program 102 enqueues many work items, the memory requirements for storing all the pre-queue stack traces can be very large, and can expand rapidly. In order to handle memory usage, a pruner 306 can prune or remove unneeded pre-queue stack frames 116 from memory. FIG. 3 illustrates a block diagram 300 of an example pruner 306 for clearing pre-queue stack frames 304 from memory 302. In this example, a work item event monitor 308 can actively monitor work items or passively receive work item event data. The work item event monitor can be set to execute periodically to look for new or updated work item event data. When the work item event monitor 308 determines that certain pre-queue stack frames 310 are no longer needed, such as when a work item has completed execution, the work item event monitor 308 can cause the pruner 306 to free up the corresponding location in memory 302.

In another variation for optimizing memory usage, the system can recognize patterns of similar or identical pre-queue stack frames. Then the system can eliminate the need to store duplicates of such pre-queue stack frames 110. For example, a task may schedule a task, then that task schedules other similar or identical tasks. The system can apply an algorithm to recognize such redundancy or patterns, and fold that information into a representation of the pre-queue stack frames 110. Some examples of such tasks with a high degree of predictability or similarity include a timer task or a task to process a large input stream. The system can collapse or compress pre-queue stack frames to reduce the memory overhead of that redundancy. In one variation where multiple work items refer to the same initial stack frame 104, the system can use a single "reference" pre-queue stack frame 110, and link multiple queued work items 108 to that single pre-queue stack frame 110. Then the pruner 306 can track when the last of the multiple queued work items no longer needs that single pre-queue stack frame, and refrain from pruning that single pre-queue stack frame until that time. In another variation where multiple work items refer to a similar but not identical initial stack frames 104, the system can again use a "reference" pre-queue stack frame 110, and then store, for additional similar work items, a first pointer to the "reference" pre-queue stack frame and a second pointer to a set of changes from the "reference" pre-queue stack frame. This may conserve substantial amounts of memory, especially if the changes are minor. The memory 302 can accommodate a larger number of changes than entire stack frames. In connection with this, the system can present analytics or metrics indicating how much memory has been conserved, for example. The different optimization behaviors can be applied automatically, based on debugging flags in the code, or manually.

If the optimizations are insufficient or if no optimizations are applied and memory is full, the system can prioritize the pre-queue stack frame 110 and can discard pre-queue stack frame 110 that may still be needed. For example, certain portions of the code may be flagged as especially prone to crashes, and thus have a higher priority. If memory is low, the system can discard pre-queue stack frame 110 for lower priority work items and keep pre-queue stack frame 110 for higher priority work items. If memory is completely full, the system can evaluate work items being enqueued to determine their priority and determine whether to remove a lower priority stored pre-queue stack frame to accommodate the pre-queue stack frame of a work item being enqueued.

Figure 4:
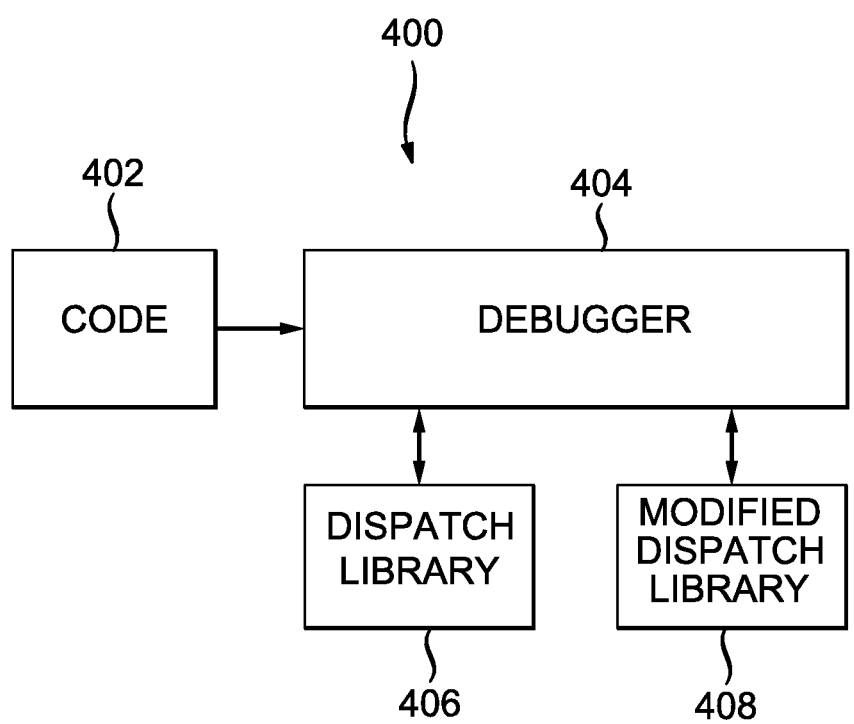
FIG. 4 illustrates an example debugger for use with queue debugging.

An example debugger can switch between enabled and not enabled states for providing or generating stack traces for work items queued for asynchronous execution. FIG. 4 illustrates an example debugger 404 for use with queue debugging that can switch between a dispatch library 406 that does not manage stack trace data for queued work items and a modified dispatch library 408 that manages stack trace data for queued work items. In this example, the debugger 404 is associated with executing code 402. The debugger can be toggled to use the dispatch library 406 which queues work items, but does not store pre-queue stack frames, or can be toggled to use a modified dispatch library 408 which does store pre-queue stack frames. In this way, a developer can choose whether to enable the additional functionality, or the debugger 404 can perform a preliminary analysis of the code 402 to determine whether the code 402 is above a "threadiness" threshold to justify using the modified dispatch library 408. The program being executed may not be aware that different dispatch libraries are being used, and the debugger 404 can switch between different dispatch libraries at any time.

Figure 6:
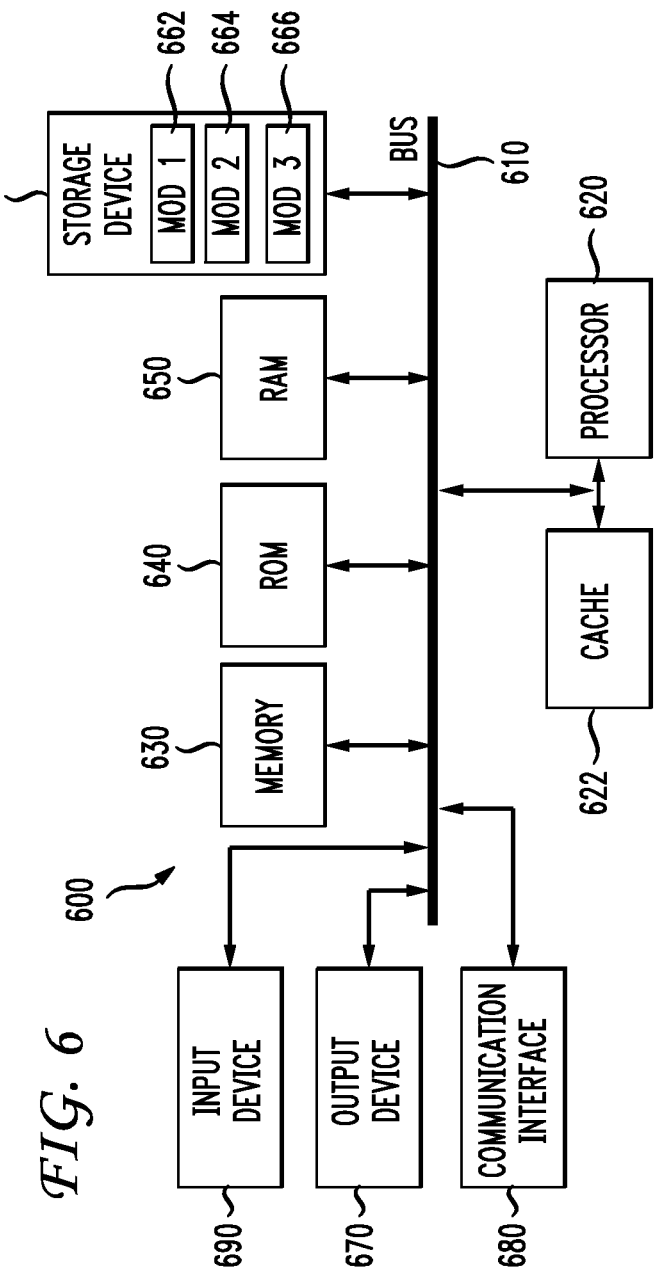
FIG. 6 illustrates an example system embodiment.

Having disclosed some basic system components and concepts, the disclosure now turns to the exemplary method embodiment. For the sake of clarity, the method is described in terms of an exemplary system 600 as shown in FIG. 6 configured to practice the respective method. The steps outlined herein are exemplary and can be implemented in any combination or permutation thereof, including variations that exclude, reorder, add, or modify certain steps.

Figure 5:
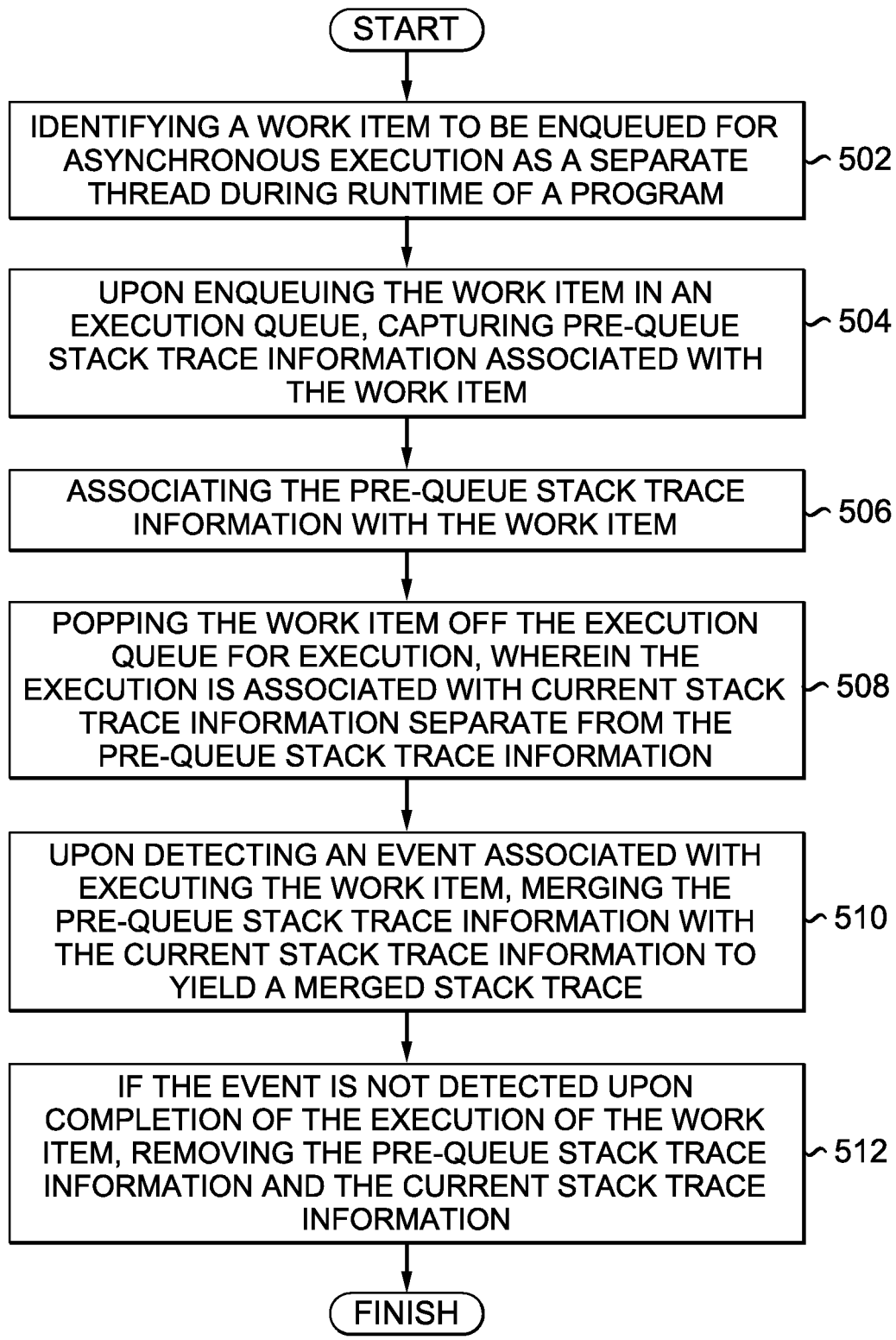
FIG. 5 illustrates an example method embodiment for providing stack trace information for tasks queued for asynchronous execution.

FIG. 5 illustrates an example method embodiment for providing stack trace information for tasks queued for asynchronous execution. The system can identify a task to be enqueued for asynchronous execution as a separate work item during runtime of a program (502). Upon enqueuing the task in an execution queue, the system can capture pre-queue stack trace information associated with the task (504). The pre-queue stack trace information can include information about a source of the task. The system can associate the pre-queue stack trace information with the task (506). The system can associate the pre-queue stack trace information with the task via a hook function. The system can remove the task from the execution queue for execution, wherein the execution is associated with current stack trace information separate from the pre-queue stack trace information (508).

Upon detecting an event associated with executing the task, the system can merge the pre-queue stack trace information with the current stack trace information to yield a merged stack trace (510). The event can be a crash of the program, an exception in the program, work item creation, work item execution, work item termination, or work item destruction. The event can be receiving a request from a debugger for a stack trace for the task, pausing the program, or encountering a breakpoint in the program. If the event is not detected upon completion of the execution of the task, the system can remove the pre-queue stack trace information and the current stack trace information (512). A modified dispatch library can capture the pre-queue stack trace information associated with the task (504), associate the pre-queue stack trace information with the task (506), and merge the pre-queue stack trace information with the current stack trace information (510), and a pruner can remove the pre-queue stack trace information and the current stack trace information (512).

In one variation, the system performs the following operations. Upon enqueuing a process in a queue for later asynchronous execution, the system can store in a memory pre-queue stack trace information associated with the process. Upon dequeuing the process from the queue for execution, the system can identify post-queue stack trace information associated with the process. The system can then merge the pre-queue stack trace information with the post-queue stack trace information to yield a merged stack trace for the process. The system can further identify a second process in the queue that is within a threshold similarity to the process, up to and including an exact match, and represent the process and the second process in the memory in a compressed format. The compressed format can include one of sharing same pre-queue stack trace information between the process and the second process, and storing a set of changes from the pre-queue stack trace information for the process, wherein the set of changes is associated with the second process. A custom dispatch library can manage storing the pre-queue stack trace information, identifying post-queue stack trace information, and merging the pre-queue stack trace information with the post-queue stack trace information. The custom dispatch library can be part of a debugger, and the debugger can toggle between a standard dispatch library and the custom dispatch library. The system can further identify, prior to enqueuing the process, that the process is flagged to maintain stack trace information through the queue.

In another variation, the system can enqueue, via a debugger, a work item in an execution queue for asynchronous execution, then associate, via a hook function, pre-queue stack trace information with the work item. The system can remove the work item from the execution queue for execution, and merge the pre-queue stack trace information with current stack trace information to yield a merged stack trace, wherein the current stack trace information is separate from the pre-queue stack trace information prior to merging. The hook function can be inserted as part of an initialization function for a dispatch library associated with the debugger.

A brief description of a basic general purpose system or computing device in FIG. 6 which can be employed to practice the concepts, methods, and techniques is disclosed below. With reference to FIG. 6, an exemplary system and/or computing device 600 includes a processing unit (CPU or processor) 620 and a system bus 610 that couples various system components including the system memory 630 such as read only memory (ROM) 640 and random access memory (RAM) 650 to the processor 620. The system 600 can include a cache 622 of high-speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various operations or actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the processor. The processor 620 may be a self-contained computing system, containing multiple cores or processors, a bus, memory controller, cache, etc. A multi-core processor may be symmetric or asymmetric. The processor 620 can include multiple processors, such as a system having multiple, physically separate processors in different sockets, or a system having multiple processor cores on a single physical chip. Similarly, the processor 620 can include multiple distributed processors located in multiple separate computing devices, but working together such as via a communications network. Multiple processors or processor cores can share resources such as memory 630 or the cache 622, or can operate using independent resources. The processor 620 can include one or more of a state machine, an application specific integrated circuit (ASIC), or a programmable gate array (PGA) including a field PGA.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 660 can include software modules 662, 664, 666 for controlling the processor 620. The system 600 can include other hardware or software modules. The storage device 660 is connected to the system bus 610 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 620, bus 610, display 670, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 620 executes instructions to perform "operations", the processor 620 can perform the operations directly and/or facilitate, direct, or cooperate with another device or component to perform the operations.

Although the exemplary embodiment(s) described herein employs the hard disk 660, other types of computer-readable storage devices which can store data that are accessible by a computer, such as magnetic cassettes, flash memory cards, digital versatile disks (DVDs), cartridges, random access memories (RAMs) 650, read only memory (ROM) 640, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 620 can include all types of processors disclosed herein, including a virtual processor. However, when referring to a virtual processor, the processor 620 includes the software components associated with executing the virtual processor in a virtualization layer and underlying hardware necessary to execute the virtualization layer. The system 600 can include a physical or virtual processor 620 that receive instructions stored in a computer-readable storage device, which cause the processor 620 to perform certain operations. When referring to a virtual processor 620, the system also includes the underlying physical hardware executing the virtual processor 620.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
   identifying a task to be enqueued for asynchronous execution as a separate thread during runtime of a program;
   upon enqueuing the task in an execution queue, capturing pre-queue stack trace information associated with the task, wherein stack trace information comprises debugging information that provides a backtrace to at least one portion of a program that caused the task to become enqueued;
   associating the pre-queue stack trace information with the task;
   removing the task from the execution queue for execution, wherein the execution is associated with current stack trace information separate from the pre-queue stack trace information;
   upon detecting an event associated with executing the task, merging the pre-queue stack trace information with the current stack trace information to yield a merged stack trace; and
   if the event is not detected upon completion of the execution of the task, removing the pre-queue stack trace information and the current stack trace information.

2. The method of claim 1, wherein the event comprises at least one of a crash of the program, an exception in the program, thread creation, thread execution, thread termination, or thread destruction.

3. The method of claim 1, wherein the event comprises at least one of receiving a request from a debugger for a stack trace for the task, pausing the program, or encountering a breakpoint in the program.

4. The method of claim 1, wherein the pre-queue stack trace information comprises information about a source of the task and at least a portion of a stack frame of the queue at the time the task was enqueued.

5. The method of claim 1, wherein a modified dispatch library captures the pre-queue stack trace information associated with the task, associates the pre-queue stack trace information with the task, and merges the pre-queue stack trace information with the current stack trace information, and wherein a pruner removes the pre-queue stack trace information and the current stack trace information.

6. The method of claim 1, wherein the pre-queue stack trace information is associated with the task via a hook function.

7. A system comprising:
   a processor; and
   a computer-readable memory device storing instructions which, when executed by the processor, cause the processor to perform operations comprising:
   upon enqueuing a process in a queue for later asynchronous execution, storing in a memory pre-queue stack trace information associated with the process, wherein stack trace information comprises debugging information that provides a backtrace to at least one portion of a program that caused the process to become enqueued;
   upon dequeuing the process from the queue for execution, identifying postqueue stack trace information associated with the process; and
   merging the pre-queue stack trace information with the post-queue stack trace information to yield a merged stack trace for the process.

8. The system of claim 7, the instructions, when executed by the processor, causing the processor to perform operations further comprising:
   identifying a second process in the queue having pre-queue stack trace information that is within a threshold similarity to the pre-queue stack trace information of the process; and
   representing the pre-queue stack trace information of the process and the second process in the memory in a compressed format.

9. The system of claim 8, wherein the threshold similarity is an exact match.

10. The system of claim 8, wherein the compressed format comprises one of sharing same pre-queue stack trace information between the process and the second process, and storing a set of changes from the pre-queue stack trace information for the process, wherein the set of changes is associated with the second process.

11. The system of claim 7, wherein a custom dispatch library manages storing the prequeue stack trace information, identifying post-queue stack trace information, and merging the pre-queue stack trace information with the post-queue stack trace information.

12. The system of claim 11, wherein the custom dispatch library is part of a debugger, and wherein the debugger toggles between a standard dispatch library and the custom dispatch library.

13. The system of claim 7, the instructions, when executed by the processor, causing the processor to perform operations further comprising:
   identifying, prior to enqueuing the process, that the process is flagged to maintain stack trace information through the queue.

14. The system of claim 7, the instructions, when executed by the processor, causing the processor to perform operations further comprising:
   after execution of the process, removing the pre-queue stack trace information and the post-queue stack trace information.

15. A non-transitory computer-readable storage device having stored therein instructions which, when executed by a processing device, cause the processing device to perform operations comprising:
   enqueuing, via a debugger, a thread in an execution queue for asynchronous execution;
   associating, via a hook function, pre-queue stack trace information with the thread, wherein stack trace information comprises debugging information that provides a backtrace to at least one portion of a program that caused the thread to become enqueued;
   removing the thread from the execution queue for execution; and
   merging the pre-queue stack trace information with current stack trace information to yield a merged stack trace, wherein the current stack trace information is separate from the pre-queue stack trace information prior to merging.

16. The non-transitory computer-readable storage device of claim 15, the instructions, when executed by the processing device, causing the processing device to perform operations further comprising:
   removing at least one of the pre-queue stack trace information, the current stack trace information, and the merged stack trace.

17. The non-transitory computer-readable storage device of claim 15, the instructions, when executed by the processing device, causing the processing device to perform operations further comprising:
   upon completion of the execution of the thread, removing at least one of the prequeue stack trace information, the current stack trace information, and the merged stack trace.

18. The non-transitory computer-readable storage device of claim 15, the instructions, when executed by the processing device, causing the processing device to perform operations further comprising:
   upon completion of the execution of the thread and any related threads from the queue, removing at least one of the pre-queue stack trace information, the current stack trace information, and the merged stack trace.

19. The non-transitory computer-readable storage device of claim 15, wherein the hook function is inserted as part of an initialization function for a dispatch library associated with the debugger.

20. A system comprising:
   a processor; and
   a memory device storing instructions which, when executed by the processor, cause the processor to perform operations comprising:
   dequeuing a process from an asynchronous execution queue for execution;
   establishing, in connection with the execution, post-queue stack trace information, wherein stack trace information comprises debugging information that provides a backtrace to at least one portion of a program that caused the process to become enqueued and subsequently dequeued;
   retrieving pre-queue stack trace information associated with the process that was stored prior to dequeuing the process; and
   merging the pre-queue stack trace information with the post-queue stack trace information to yield a merged stack trace for the process.

21. The system of claim 20, wherein the pre-queue stack trace information is merged upon receiving an indication of an event comprising at least one of a program crash, a program exception, thread creation, thread execution, thread termination, or thread destruction.

22. The system of claim 20, wherein the pre-queue stack trace information is merged upon receiving an indication of an event comprising at least one of receiving a request from a debugger for a stack trace for the process, pausing a program associated with the process, or encountering a breakpoint in the program.

23. The system of claim 20, wherein the pre-queue stack trace information comprises information about a source of the process.

24. The system of claim 20, wherein the pre-queue stack trace information was stored by a modified dispatch library.

25. The system of claim 20, wherein the pre-queue stack trace information is associated with the process via a hook function.

26. The method of claim 1, wherein an event comprises at least one of: a crash, an exception, a pause, or a breakpoint in a process, task, thread, or program.

27. The method of claim 1, wherein an event comprises at least one of: a work item creation, a work item execution, a work item termination, or a work item destruction.

\* \* \* \* \*